(12) United States Patent
Neukirchner

(10) Patent No.: US 8,447,515 B2
(45) Date of Patent: May 21, 2013

(54) METHOD FOR OPERATING A NAVIGATIONAL SYSTEM

(75) Inventor: Ernst-Peter Neukirchner, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 761 days.

(21) Appl. No.: 12/282,849

(22) PCT Filed: Jan. 26, 2007

(86) PCT No.: PCT/EP2007/050756
§ 371 (c)(1),
(2), (4) Date: Dec. 31, 2008

(87) PCT Pub. No.: WO2007/107393
PCT Pub. Date: Sep. 27, 2007

(65) Prior Publication Data
US 2009/0187334 A1  Jul. 23, 2009

(30) Foreign Application Priority Data
Mar. 23, 2006  (DE) .......................... 10 2006 013 388

(51) Int. Cl.
*G01C 21/00* (2006.01)
(52) U.S. Cl.
USPC ........................................................ 701/461
(58) Field of Classification Search
USPC ................. 701/200, 206, 208, 400, 409, 421, 701/430, 462, 489; 711/147, 157, 173, 200
See application file for complete search history.

(56) References Cited

U.S. PATENT DOCUMENTS

| | | | | |
|---|---|---|---|---|
| 6,112,200 A | * | 8/2000 | Livshutz et al. | 707/803 |
| 6,484,090 B1 | * | 11/2002 | Lahaije et al. | 701/532 |
| 2003/0101036 A1 | * | 5/2003 | Nagel | 703/13 |
| 2005/0159880 A1 | * | 7/2005 | Furukawa | 701/200 |

FOREIGN PATENT DOCUMENTS

| | | |
|---|---|---|
| EP | 0943894 | 9/1999 |
| WO | WO 99/58934 | 11/1999 |

OTHER PUBLICATIONS

Adamchik, Victor, "Graph Theory", Fall 2005, http://www.cs.cmu.edu/~adamchik/21-127/lectures/graphs_1_print.pdf, Accessed Mar. 5, 2012.*
Clementini, Eliseo, et al., "Management of Spatial Data: Basic Issues and Some Solutions," Apr. 5, 1990, Applied Computing, 1990.*
Choi, Amelia, et al., "A Bi-Level Object-Oriented Data Model for GIS Applications," Oct. 31-Nov. 2, 1990, Computer Software and Applications Conference, 1990.*
International Search Report, PCT International Patent Application No. PCT/EP2007/050756, dated Mar. 31, 2008.

* cited by examiner

*Primary Examiner* — James Trammell
*Assistant Examiner* — Michael D Lang
(74) *Attorney, Agent, or Firm* — Kenyon & Kenyon LLP

(57) ABSTRACT

A method for operating a navigational system, especially a navigational system for a motor vehicle, having a memory, a display unit and at least one operating element, map data being loaded from a map data memory into the memory; the map data being subdivided into first map data and second map data; the first map data including geometric data of edges of a map network stored as graphs, and the second map data including topological data and applications being carried out using the first and/or second map data loaded into the memory.

21 Claims, 3 Drawing Sheets

METHOD FOR OPERATING A NAVIGATIONAL SYSTEM

FIELD OF THE INVENTION

The present invention relates to a method for operating a navigational system, especially a navigational system for a motor vehicle, as well as such a navigational system and a storage medium regarding this, having map data.

BACKGROUND INFORMATION

Navigational systems use map data to represent a map section on a display, for showing and determining routes, for destination input, for destination finding and for route guidance of a vehicle, such as a motor vehicle, steered by a driver.

These map data may be digital map data. In the map data, roads, for example, are shown as so-called edges, crossings or turn-offs of roads being shown as so-called knots. In this context, the real road pattern is approximated by the edges and knots, the edges being described, for instance, by a concatenation of straight-line edge sections. Thus, the representation of road networks is realized using directed graphs having edges and knots. Depending on the complexity of a crossing, it is described by a knot or even several knots. There may also be edges present within a crossing.

Digital maps may also be subdivided into individual regional partitions, so that the data that are to be loaded into the memory of, for instance, a navigational system may be delimited from the data set, since the data set influences the size of the memory required and the loading speed and the speed of processing. In a typical manner, the division of the map data into the partitions takes along lines of constant geographical length and width, so that approximately rectangular regions are defined as partitions. However, based on this subdivision, it is necessary to subdivide the edges which intersect one or more such boundaries between partitions, and to associate the subdivided edges with the respectively adjacent partitions or to store them redundantly in the adjacent partitions or to have them reported on by one of the participating adjacent partitions.

A subdivision of map data in partitions and a division of edges at partition borders is described in International Application WO 99/58934.

The division of the edges, however, causes additional data sets since, when an edge is divided, to connect the two partial edges, a knot of the map network has to be fitted in. This causes additional expenditure because of additional algorithmic steps, for instance, in response to the use of a navigational system for route calculation.

The redundant storage of the edges in several partitions has the disadvantage of leading to an increase in the data set. Also, in this case, when reading several partitions into one memory, the respective application has to ascertain the redundant edges and sort out edge data that are partially present several times, which also requires additional processor power, and consequently slows down the overall process.

The reporting of elements of other partitions has the disadvantage that more data have to be loaded into the memory than are currently needed, as, for instance, for representing maps, not only those partitions have to be loaded into the memory which are to be displayed, but all those partitions have to be loaded into the memory to which a report refers.

SUMMARY

It is an object of the present invention to create a method for operating a navigational system in which the disadvantages of the related art are reduced or even avoided. Furthermore, it is an object of the present invention to create a navigational system, using which the method of the present invention is able to be performed. It is also the object to create a storage medium having map data stored on it which permits an improved method sequence while using map data.

The object according to the present invention may be attained by a method for operating a navigational system, especially a navigational system for a motor vehicle, having a memory, a display unit and at least one operating element, map data being loaded from a map data memory into the memory; the map data being subdivided into first map data and second map data; the first map data including geometric data of edges of a map network stored as graphs, and the second map data including topological data and applications being carried out using the first and/or second map data loaded into the memory. Geometric data, in this context, are preferably data sets having data of directed graphs of edge sections which represent the position of an edge or rather its pattern. Topological data are data between a starting point and an end point of an edge or of an edge section, such as the distance between the starting point and the end point, etc. It is particularly advantageous, in this context, that the digital map is structured in such a way that applications, which require the geometrical contents of the map data, find the complete content in each partition, and applications which only require topological contents do not in each case have to read into the memory all partitions lying between a starting point and an end point.

Because of this subdivision, according to the present invention, between geometric data and topological data, applications, such as application programs, which only require geometric data, may access exclusively geometric data sets. Such applications are, for example, the map representation of a region of the map on a display unit, or the map-supported position finding function in navigational systems.

Applications which preferably use only topological data are, for instance, applications of route calculation or the route guidance function.

It is furthermore advantageous, compared to the related art, that divisions of elements, such as edges, at the boundaries of partitions are undertaken only for the geometric data, and that the topological data are not divided at boundaries between partitions, and thereby no additional expenditure is created with respect to the topological data, and no additional data are generated.

Applications which use only topological data read in only the data of those partitions in which nodes of the topological data lie, and the partitions lying in between are not required in this context. This is particularly expedient in the case of route calculations over long distances in which there are no turn-offs, such as in the case of travel connections or routes through regions having a very thin road network, such as in deserts.

It is especially advantageous if relationships exist between data sets of the first map data and the second map data, or if these are formed. With that, an easy transferability of results between different applications may be implemented. It is particularly advantageous if the relationships or the data on which the formation of the relationships are based are stored as third map data. It is also expedient if the relationships, or the data on which the formation of the relationships are based, are associated with the first and/or the second map data sets.

It is particularly advantageous if the relationships, or the data on which the formation of the relationships are based, are stored independently of the first and/or the second map data sets. In this case, the relationships or the data usable for the formation of the relationships are only read into the memory if they are needed.

It is particularly advantageous if first, second and/or third map data sets are associated with the respective partitions of the map. It is also advantageous if the topological data sets associated with the geometric data sets and preferably also their partitions are stored, and are particularly stored in association with them.

It is also expedient if, furthermore, the partitions, in which the geometric data sets lie, which are associated with the topological data sets, are stored or are stored associated with the latter.

For better handling, storing or for better associating, it is expedient if first and/or second and/or third data sets and or partitions are marked using identifications. Such identifications may be numerical identifications, for instance.

According to an embodiment of the present invention, the object with regard to the navigational system is attained by a navigational system having a memory, a display unit and at least one operating element, the memory being used for storing selected map data from a map data memory, and applications access the memory, and the map data stored there, to carry out a method described above.

According to an example embodiment of the present invention, the object with regard to the storage medium is attained by a storage medium having a digital map having map data, the map data being subdivided into first map data and second map data, the first map data including geometric data of edges of a map network stored as graphs, and the second map data including topological data.

BRIEF DESCRIPTION OF THE DRAWINGS

The present invention is explained below in greater detail, based on exemplary embodiments and with the aid of the figures.

DETAILED DESCRIPTION OF EXAMPLE EMBODIMENTS

Figure 1:
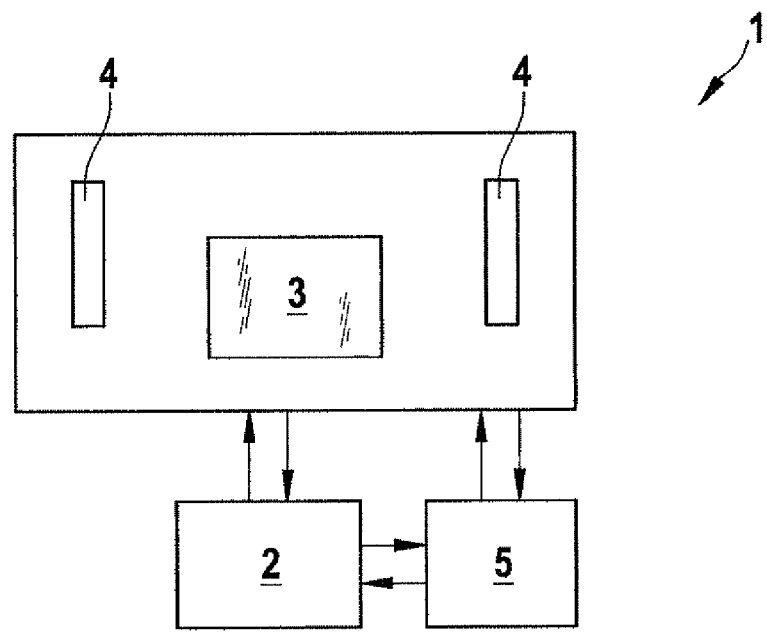
FIG. 1 shows a schematic representation of a navigational system according to the present invention.

FIG. 1 shows a navigational system 1 in a schematic representation, having a memory 2, an indicating unit 3, such as a monitor or a display, and at least one operating element 4. Memory 2 is used for storing selected map data from a map data memory 5, the applications accessing memory 2 and the map data stored there. Map data memory 5 may advantageously be a hard disk storage, in this instance, a CD-ROM, a DVD, a semiconductor memory or another type of memory, on which at least selected map data of a digital map are stored.

Navigational system 1 generates map representations on display element 3, for example, calculated routes being displayable in a map representation on the display element.

Using operating element 4, the operator is able to input a travel destination, for instance, start a route guidance or another application or carry it out.

Map data, in this context, are data or data sets which include the geometry of edges and possibly nodes of a network stored as graphs, and data which include a topology.

In navigational systems for motor vehicles, among the applications there are, for instance, the display of map contents on a display unit and the support of the position-finding function on the road network, also known as map matching. By contrast, the topological data are preferably used for the calculation of routes and for route guidance.

Figure 2:
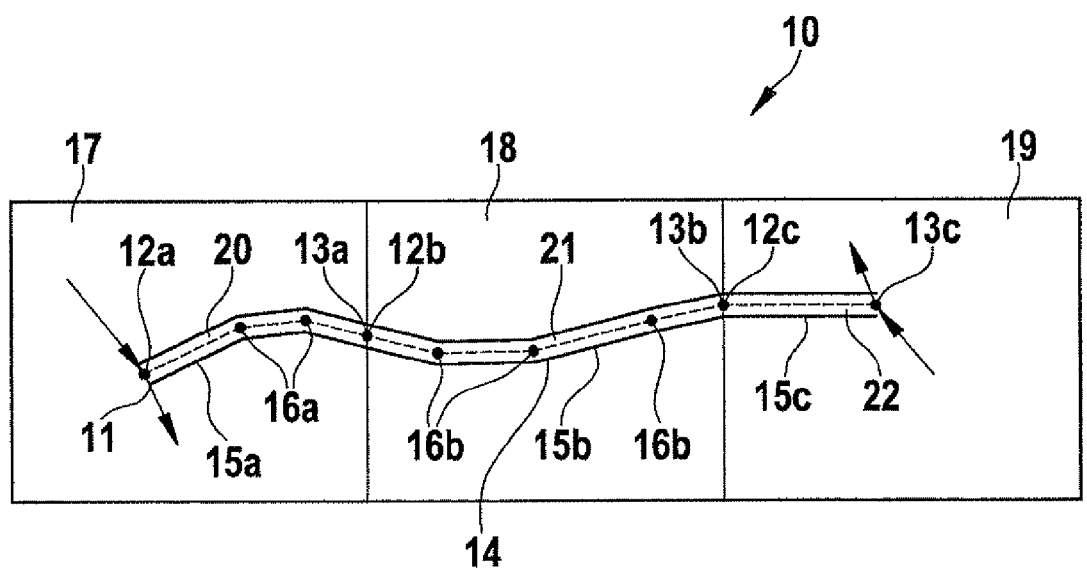
FIG. 2 shows a map section.

To explain the example method according to the present invention, FIG. 2 shows a section of a map 10, in which the geometry of a road section is shown as a directed polyline 11, between a starting point 12*a*, 12*b*, 12*c* and an end point 13*a*, 13*b*, 13*c* as edge 14, having corresponding edge sections 15*a*, 15*b*, 15*c*. Besides starting point 12*a* and end point 13*c*, a specifiable number of intermediate points 16*a*, 16*b* is also generated and/or stored, in this instance. The map data may also be subdivided into regions, such as partitions 17, 18, 19, in this context. Thus, the polyline having starting point 12*a* and end point 13*a* and intermediate points 16*a* lie in partition 17. Thus, the polyline having starting point 12*b* and end point 13*b* and intermediate points 16*b* lie in partition 18. The polyline having starting point 12*c* and end point 13*c* lie in partition 19. Consequently, the end points of one partition are equal to the starting points of the next partition. Thus, the geometry data for those road sections that intersect a partition boundary are divided at this boundary between the partitions. The present exemplary embodiment of FIG. 2 has three partitions, P1, P2 and P3, designated by reference numerals 17 to 19. Each partition includes a data set 20, 21, 22 having geometric data of the road section in the partition. Depending on the course of the road, several geometric data sets may also be usable for the course of the road section in the partition, for which see also FIG. 3.

Figure 3:
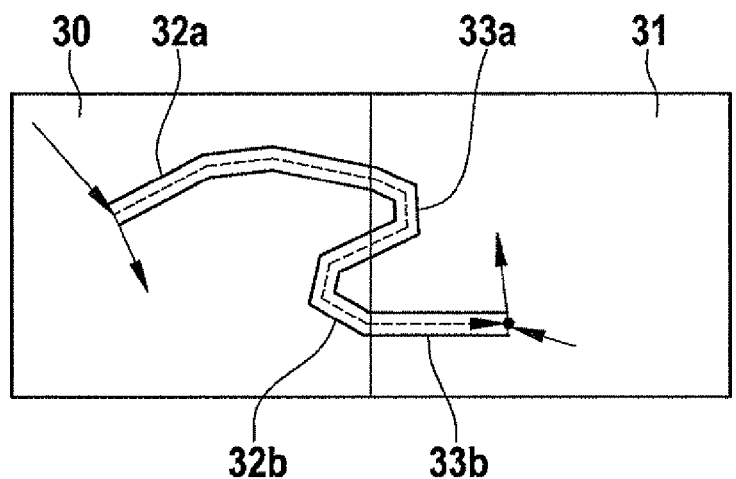
FIG. 3 shows a map section.

In FIG. 3 one may see two partitions 30, 31, in both partitions the course of the road or the course of the edge being divided into two sections 32*a*, 32*b* and 33*a* and 33*b*. Consequently, for each partition, two data sets of geometric data are provided, since the course of the road has two regions in each partition, caused by their curvy form. Thus, partitions 30, 31 include just those data of the geometric component which is actually present in them.

The topology of road sections is stored by their linkages with crossings or using the data sets describing them, for one road section advantageously only one single topological data set being used in each case. For this purpose, this topological data set is able to be stored in, or in adjunct to the partition in which the respective road section begins or ends. In another exemplary embodiment, the topological data set may also be linked or stored with other partitions.

Figure 4:
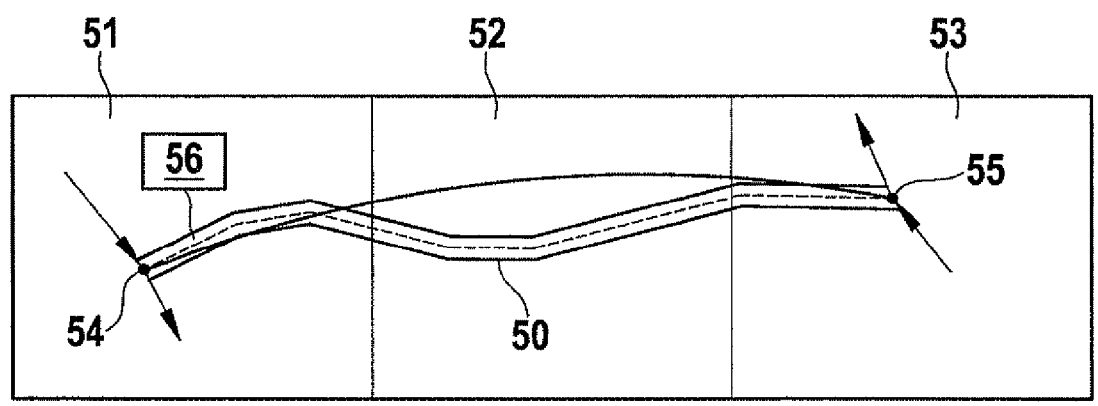
FIG. 4 shows a map section.

FIG. 4 shows a road section 50, which corresponds to the road section of FIG. 2. In this context, only in partition 51 is there a topological data set 56 associated or stored, since the topological data set includes only data of the road section between the two crossings 54 and 55. These may, for instance, be data with respect to the distance or length of the section or the travel time required for this section. Therefore, the topological data set requires no intermediate points, since only data between the starting points and the end points are relevant. That is why the data of partition 51 and 53 are required in order to form or assign the topology between crossings 54 and 55, but the data of partition 52 are not required for this, and are consequently also not read into a memory.

What is advantageous in the method according to the present invention is that each partition and each geometric and topological data set is characterized using an identification, such as an identifier, a numerical identification being able to be used particularly advantageously. This identification uniquely identifies the data set. Because of this identification, a relationship between the data sets is able to be generated in each case.

For instance, relationships between geometric data sets and topological data sets may be used if the position-finding function has determined the position of a vehicle along the geometric course of the road, and if, starting from this position, a route is to be determined while using topological data sets, or if a route guidance function is to keep following the route.

The relationships between the topological data sets and the geometric data sets may also be used if a route calculated in the topological network is to be shown geometrically in a map representation.

According to the present invention, in order to set up relationships of geometric data sets to topological data sets, for each geometric data set the identification of the topological data set, to which it belongs, is stored. It is also expedient, for the identification of the topological data set, to store the identification of the partition to which it belongs, since the topological data set may belong to a different partition than the geometric data set.

By this, for a given geometric data set, one may access directly the partition in which the topological data set is stored. By this, for a given geometric data set, one may access directly the partition in which the topological data set is stored.

The identifications of the topological data sets and their partition identifications may be stored in a list, table, data bank or data file kept separately from the geometric data sets, so that it only has to be read if such a relationship is needed.

For each topological data set, the identifications of all those partitions are preferably stored which include geometric data sets which describe the course of the road section represented by the topological data set. The storage of the identifications of all associated geometric data sets is not absolutely necessary for this, because one may assume that a partition is always read or loaded as a whole into the memory, such as a working memory, of the system, such as the navigational system. Because of that, all data sets are able to be found via the first-described relationships of geometric data sets to topological data sets.

Furthermore, it may be advantageous if identifications of the partitions, in which geometric data sets lie or with which they are associated, are stored in their own or in separate lists, tables, data files or data banks. In this case, these data may be read in if they are needed or do not have to be read in if they are not needed.

Figure 5:
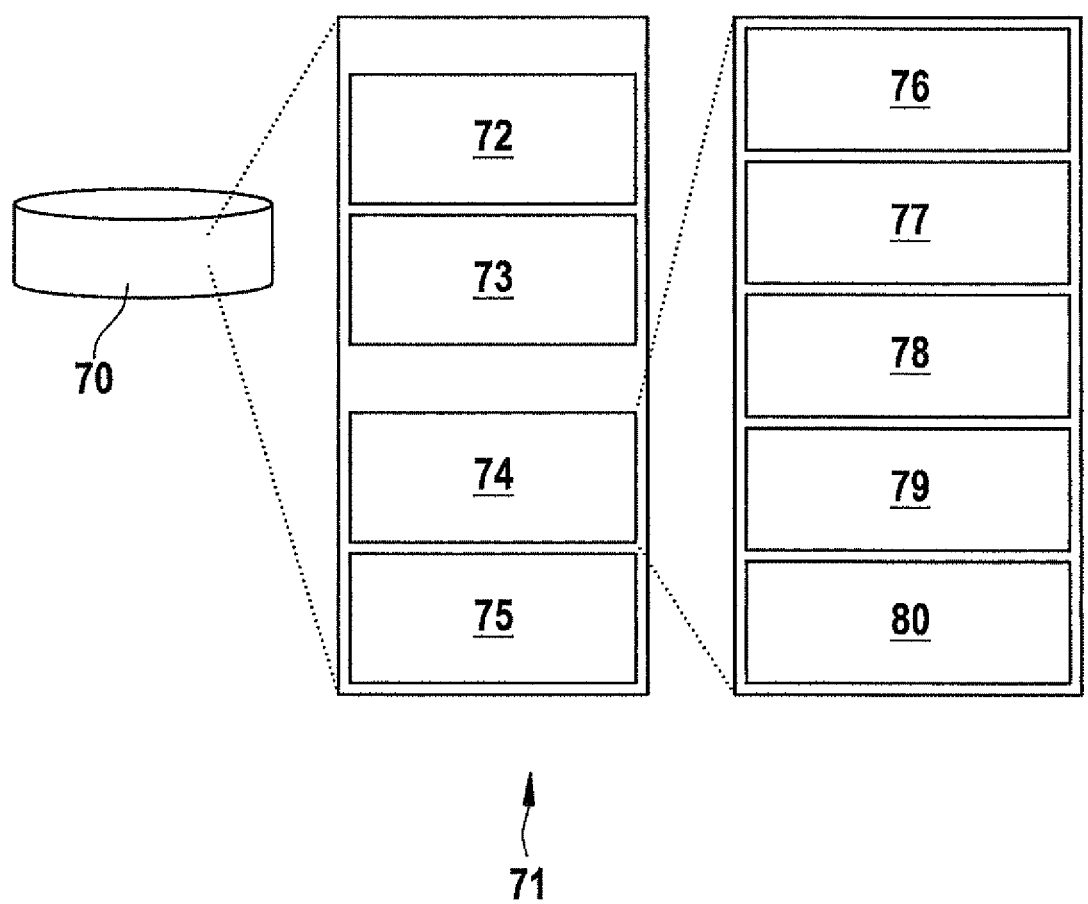
FIG. 5 shows a schematic representation of the structure of the stored map data.

FIG. 5 shows a schematic representation of an exemplary embodiment of a subdivision of a digital map in partitions, according to the present invention. For this purpose, map data 71 are stored in a memory 70, such as a CD-ROM, a DVD, a disk memory, a semiconductor memory or another type of memory. Data 71 of the map, in a first stage, are subdivided into data sets 72, 73, 74, . . . of individual partitions, a data set 75 being also able to be present, which may contain or include non-geometrically partitioned data. In this context, data sets 72, 73 and 74 stand for data sets of partitions P1, P2, . . . and Pn, n being a natural number as continuous index of the partition numbering.

In a second stage one may recognize, for instance, for partition Pn the structuring of the data sets for this partition. The geometric data sets are stored in block 76. In block 77, a table, list or data file of the topological data sets associated with the geometric data sets, and preferably also their partitions, are stored. Block 78 illustrates the stored topological data sets. Block 79 shows the table, list or data file of the partitions in which geometric data sets lie, that are associated with the topological data sets. The remaining stored data sets of a partition are designated in block 80.

What is claimed is:

1. A method for operating a navigational system for a motor vehicle, the navigational system including a memory, a display unit and at least one operating element, the method comprising:
    loading map data from a map data memory into the memory, the map data being subdivided into first map data and second map data, the first map data including geometric data of road elements, and the second map data including a topology of a street network stored as edges and nodes; and
    carrying out navigational applications using at least one of the first map data and the second map data loaded into the memory, wherein relationships exist between data sets of the first map data and of the second map data, and wherein the relationships are stored as third map data.

2. The method as recited in claim 1, wherein the map data are subdivided into partitions and at least one of first, second, and third map data sets are associated with partitions of the map data, and wherein the topological data associated with the geometric data and also the partitions are stored.

3. The method as recited in claim 2, wherein the partitions, in which geometric data lie, which belong to the topological data, are stored.

4. The method as recited in claim 2, wherein at least one of the first data set, the second set, the third data set and the partitions are designated using identifications.

5. The method as recited in claim 2, wherein the edges of the topological data are not divided at the boundaries between the partitions.

6. The method as recited in claim 1, wherein the partitions, in which geometric data lie, which belong to the topological data, are stored.

7. The method as recited in claim 1, wherein at least one of the first data set, the second set, the third data set and the partitions are designated using identifications.

8. A method for operating a navigational system for a motor vehicle, the navigational system including a memory, a display unit and at least one operating element, the method comprising:
    loading map data from a map data memory into the memory, the map data being subdivided into first map data and second map data, the first map data including geometric data of road elements, and the second map data including a topology of a street network stored as edges and nodes; and
    carrying out navigational applications using at least one of the first map data and the second map data loaded into the memory, wherein relationships exist between data sets of the first map data and of the second map data, and wherein the relationships are stored independently of the first map data and the second map data.

9. A method for operating a navigational system for a motor vehicle, the navigational system including a memory, a display unit and at least one operating element, the method comprising:
    loading map data from a map data memory into the memory, the map data being subdivided into first map data and second map data, the first map data including geometric data of road elements, and the second map data including a topology of a street network stored as edges and nodes; and
    carrying out navigational applications using at least one of the first map data and the second map data loaded into the memory, wherein the map data are subdivided into partitions and at least one of first, second, and third map data sets are associated with partitions of the map data.

10. The method as recited in claim 9, wherein the topological data associated with the geometric data and also the partitions are stored.

11. The method as recited in claim 9, wherein the partitions, in which geometric data lie, which belong to the topological data, are stored.

12. The method as recited in claim 9, wherein at least one of the first data set, the second set, the third data set and the partitions are designated using identifications.

13. The method as recited in claim 9, wherein the edges of the topological data are not divided at the boundaries between the partitions.

14. A navigational system, comprising:
a memory storing selected map data from a map data memory;
a display element;
at least one operating element; and
applications adapted to access the memory and the map data stored in the memory, the applications adapted to load the map data memory into the memory, the map data being subdivided in a first map data and second map data, the first map data including geometric data of road elements, and the second map data including a topology of a street network stored as edges and nodes, wherein relationships exist between data sets of the first map data and of the second map data, and wherein the relationships are stored as third map data.

15. A computer readable medium having at least one application program, which is executable by a processor, comprising:
a digital map having map data, the map data being subdivided into first map data and second map data, the first map data including geometric data of road elements, and the second map data including a topology of a street network stored as edges and nodes; and
a program code arrangement having program code for loading the map data into memory and for using the first map data and the second map data, wherein relationships exist between data sets of the first map data and of the second map data, and wherein the relationships are stored as third map data.

16. A method for operating a navigational system for a motor vehicle, the navigational system including a memory, a display unit and at least one operating element, the method comprising:
loading map data from a map data memory into the memory, the map data being subdivided into first map data and second map data, the first map data including geometric data of edges of a map network stored as graphs, and the second map data including topological data; and
carrying out navigational applications using at least one of the first map data and the second map data loaded into the memory, wherein relationships exist between data sets of the first map data and of the second map data, and wherein the relationships are stored independently of the first map data and the second map data.

17. The method as recited in claim 16, wherein the map data are subdivided into partitions and at least one of first, second, and third map data sets are associated with partitions of the map data, and wherein the topological data associated with the geometric data and also the partitions are stored.

18. The method as recited in claim 17, wherein the partitions, in which geometric data lie, which belong to the topological data, are stored.

19. The method as recited in claim 17, wherein at least one of the first data set, the second set, the third data set and the partitions are designated using identifications.

20. The method as recited in claim 16, wherein the partitions, in which geometric data lie, which belong to the topological data, are stored.

21. The method as recited in claim 16, wherein at least one of the first data set, the second set, the third data set and the partitions are designated using identifications.

* * * * *

UNITED STATES PATENT AND TRADEMARK OFFICE
CERTIFICATE OF CORRECTION

PATENT NO. : 8,447,515 B2 Page 1 of 1
APPLICATION NO. : 12/282849
DATED : May 21, 2013
INVENTOR(S) : Ernst-Peter Neukirchner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Eighth Day of September, 2015

Michelle K. Lee
*Director of the United States Patent and Trademark Office*